June 24, 1930.  H. I. DANZIGER  1,767,206

FOIL CONDENSER AND METHOD OF MAKING THE SAME

Filed May 21, 1927

INVENTOR
Harold I. Danziger,
BY
Frederick Breitenfeld
ATTORNEY

Patented June 24, 1930

1,767,206

UNITED STATES PATENT OFFICE

HAROLD I. DANZIGER, OF NEW YORK, N. Y., ASSIGNOR TO CONDENSER CORPORATION OF AMERICA, OF JERSEY CITY, NEW JERSEY, A CORPORATION OF NEW YORK

FOIL CONDENSER AND METHOD OF MAKING THE SAME

Application filed May 21, 1927. Serial No. 193,094.

My present invention relates generally to electrical condensers, and has particular reference to condensers of the coiled foil type. Coordinately, my invention relates to a method of manufacturing such condensers.

Before describing my invention in detail, I will premise that the condensers to which my invention has particular reference are prepared by interwinding two superposed continuous foil strips and interposed strips of paper or similar dielectric. Condensers of this character are advantageously wound in a manner which exposes the respective foil strips at opposite side edges of the interposed dielectric strip or strips, suitable electrical connection being made to these exposed edges. Where such electrical connection is effected by interposing one or more conducting elements at spaced portions of each coil end, the resulting condenser is one which is known as an "inductive" condenser because the windings of the foil strip between the conducting elements embody a certain inductance which has recognized effects upon the efficiency of the condenser.

My invention relates to the production of non-inductive condensers, i. e., condensers of the character referred to wherein the finished device is practically devoid of any inductive portions. In the employment of tin foil, such condensers may be satisfactorily manufactured by simply soldering a conducting element to each exposed end of the wound coil, the solder being applied in a liberal manner which distributes it over practically all of the foil turns. In the employment of aluminum foil in place of tin foil, such a soldering procedure is rendered difficult because of the characteristics of aluminum, and my present invention obviates this particular difficulty.

Briefly, my invention contemplates the insertion of a single conducting element into the condenser body at each end and the stroking or brushing of the extreme edges of the coiled foil so as to produce and effect a close contacting relationship between said exposed edges. In this way, the conducting element is placed into almost direct electrical connection with each of the superposed foil edges constituting the end of the coil.

For the attainment of the foregoing objects and such other objects as may hereinafter appear or be pointed out, I have illustrated one form of my invention in the accompanying drawings in which—

Figure 1:
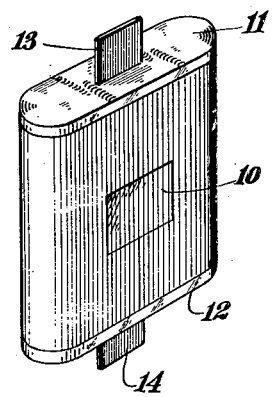
Fig. 1 is a perspective view of a complete condenser body embodying the features of my present invention.

The condenser body of Figure 1 is formed by interwinding two continuous foil strips, each of said foil strips being sandwiched between two continuous paper strips. In other words, the elements which are wound comprise six superposed strips. All of the strips may if desired be of the same width, but the two foil strips are so positioned laterally with respect to the paper strips, that one resulting coil end will be constituted of superposed layers of one foil strip, whereas the other coil end will be constituted of superposed layers of the other foil strip. After this winding has taken place, the condenser body is compressed into substantially the shape shown in Figure 1, and temporarily retained in coiled condition by means of a paster 10.

The coil end 11, comprised of one foil strip, constitutes one electrical side of the condenser, and the coil end 12, comprised of the other foil strip, constitutes the other electrical side of the condenser. These coil ends must be suitably associated with conducting elements to afford convenient electrical terminals. In accordance with the present invention, a conducting element 13, comprising a thin strip of material, is inserted into the end 11 so as to be in contact with the foil strip defining said end. A similar conducting element 14 projects or extends out of the coil end 12. The condenser body is then subjected to the usual vacuum and heat treatment to effect the proper drying thereof, and is usually impregnated with hardenable wax or similar material to improve the quality of the dielectric and to render the entire condenser body substantially firm and compact. Although my present invention does not of necessity require such heat, vacuum, and impregnation treatment, I have found it satisfactory to perform these usual steps and thereafter shape the coil ends in the manner to be presently described.

Figure 3:
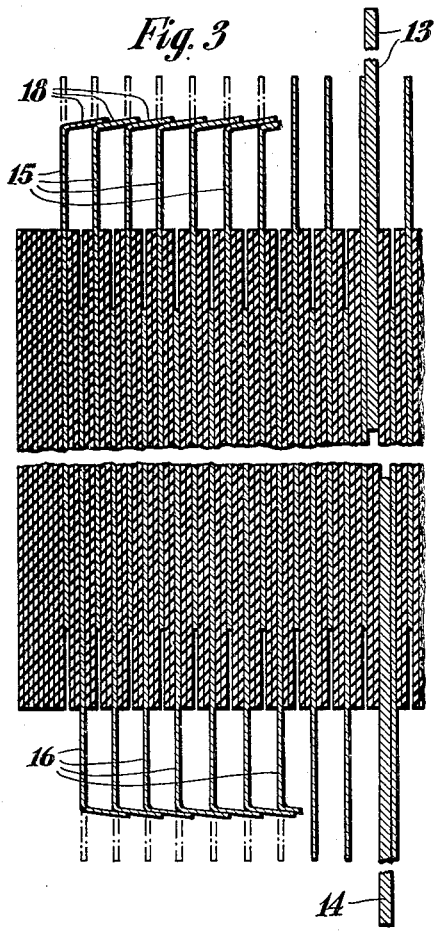
Fig. 3 is a fragmentary cross-sectional view upon a greatly enlarged scale, this view being taken substantially along the line 3—3 of Fig. 2.
Figure 4:
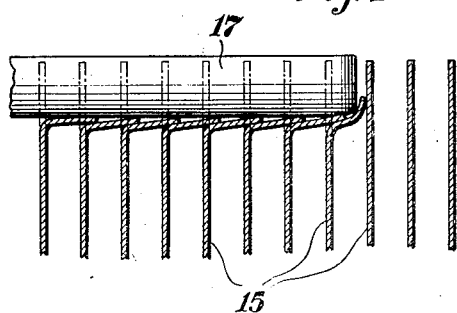
Fig. 4 is a view similar to Fig. 3, but on a still larger scale, showing one method of brushing or stroking the foil edges into the relative positions of the present construction.
Figure 5:
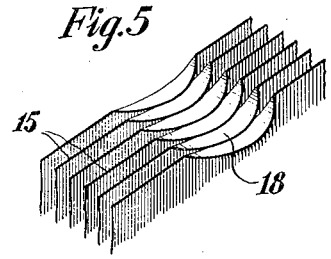
Fig. 5 is a fragmentary perspective view on an enlarged scale, showing the disposition of one stroked or brushed portion of the condenser body end.

In Figures 3, 4, and 5 I have indicated upon a greatly enlarged scale the relative dispositions of the exposed superposed foil layers adjacent to each end of the condenser body. Thus, the end 11 is constituted of a series of superposed foil layers 15 minutely spaced from each other; and the coil end 12 is similarly constituted of the superposed foil layers 16. The connecting element 13 extends out of the end 11, and makes contact within the body of the condenser with one of the layers 15. The conducting element 14 is similarly arranged with respect to the end 12, and makes contact with one of the layers 16.

Although the superposed foil layer ends appear to the naked eye to be in very close superposition, nevertheless a positive and close electrical connection does not normally exist between them. To effect such a close relationship, I bend or stroke the extreme edges into transverse overlapping relationship, and the natural characteristics of the foil cause these bent edges to retain their brushed positions as shown in Figure 5. This brushing does not cover the entire coil end, but is effected only upon predetermined areas which thereafter assume a shiny and smooth appearance, as will be understood.

To effect the brushing or stroking of the extreme foil layer edges, I prefer to employ a tool such as that shown in Figure 4. The tool will comprise a bar or rod 17 of rigid material, and it is preferably applied to the condenser end by laying the condenser body flat upon a rigid base and thereupon bringing the tool down vertically along the condenser end. The tool may be of any suitable shape or character, but it will be understood that its action is not a cutting or shearing one but merely a stroking action as indicated in Figure 4. It will also be understood that Figures 3 and 4 are greatly exaggerated and upon greatly enlarged scales; the brushing action of the tool affecting only the extreme edges of the foil layers and having no substantial effect upon the overall dimensions or shape of the condenser body.

Figure 2:
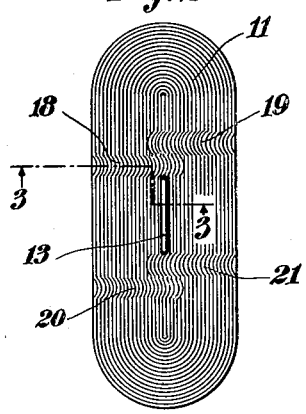
Fig. 2 is an end view of the condenser body of Fig. 1.

In Figure 2 I have illustrated one preferable arrangement of brushed areas and conducting element. In this figure, I have shown the conducting element 13 inserted into the end 11 at substantially the center thereof, and I have shown two sets of brushed areas on each side of the element 13 respectively. Thus, one set comprises the areas 18 and 19, and the other set comprises the areas 20 and 21. The areas 18 and 20 are treated by a tool moving from left to right, and the areas 19 and 21 are similarly treated by a tool moving from right to left. The areas 18 and 20 preferably overlap the areas 19 and 21, so that a positive electrical connection between all of the superposed foil layers is assured.

It will be understood that the tools employed form no part of the present invention. For example, the areas 18 and 19 might be treated in one operation by a tool having two elements which coact in the nature of a pair of shears. In other words, the areas 18 and 19 may be treated by a sort of pinching operation. On the other hand, the tool which treats the area 18 or 20 may be continued in its movement from left to right across the entire width of the condenser end. Similarly, it is not essential, in carrying out my invention, that more than one continuous area be treated.

Nor do I mean to limit myself to the employment of a single conducting element in each end. One or more of such elements may be employed, as has been the case heretofore in so-called "inductive" condensers, and in general, it will be understood that the essential features of the present invention are distinct from and unaffected by any particular relative arrangement of conducting elements and treated areas.

Although I prefer to perform the impregnating operation before brushing the condenser ends in the manner described, nevertheless such operation or operations may be performed at any convenient stage or stages of the process of manufacture. Where the impregnation treatment is made to take place prior to the brushing operations, I have found that the deposited and hardened wax does not in any way impair the efficacy of the present invention. Apparently, the stroking of the foil edges squeezes out or removes the negligible amounts of hardened impregnating material which may theoretically be thought to adhere thereto.

By the present method of manufacture, I am enabled to produce uniformly efficient condensers of a non-inductive character without necessity for tedious or annoying soldering operations and without the necessity for complicated machinery or treatment. The present method is particularly advantageous where aluminum foil is employed, although my invention is by no means limited to the employment of such foil. In general, it will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative and not in a limiting sense.

Having thus described my invention and illustrated its use, what I claim as new and desire to secure by Letters Patent is—

1. A condenser body comprising a coiled set of layers of alternately superposed aluminum foil and paper strips, a terminal element in the coil and contacting with a foil layer, said foil layers and said terminal projecting beyond the paper layers at an end of the coil, the foil edges in a predetermined area of said coil end being bent transversely into contacting relationship, whereby said foil layers are in electrical contact with each other and electrically connected to said terminal.

2. A condenser body comprising a coiled set of layers of alternately superposed aluminum foil and paper strips, certain of the foils being of one polarity and certain of the foils being of the other polarity, a terminal element in the coil and contacting with a foil layer of one polarity, another terminal element in the coil and contacting with a foil of the other polarity, said foil layers and said terminal of one polarity projecting beyond the paper layers at one end of the coil, said foil layers and said terminal of the other polarity projecting beyond the paper layers at the other end of said coil, the foil edges in a predetermined area of each of said coil ends being bent transversely into contacting relationship, whereby said foil layers of one polarity are in electrical contact with each other and electrically connected to the terminal of the same polarity, and said foil layers of the other polarity are in electrical contact with each other and electrically connected to said terminal of the same polarity.

3. The method of forming a condenser body which comprises coiling a set of layers of alternately superposed aluminum foil and paper strips about a terminal element in contact with said metal, said foil layers and said terminal projecting beyond the paper layers at an end of the coil, and stroking over said projecting foil ends successively into contact with each other.

4. The method of forming a condenser body which comprises coiling a set of layers of alternately superposed metal foil and paper strips, said foil layers projecting beyond the paper layers at an end of the coil, and stroking over said projecting foil ends toward the central part of the coil into contact with each other.

In witness whereof, I have signed and sealed this specification this 20th day of May, 1927.

HAROLD I. DANZIGER.